UNITED STATES PATENT OFFICE.

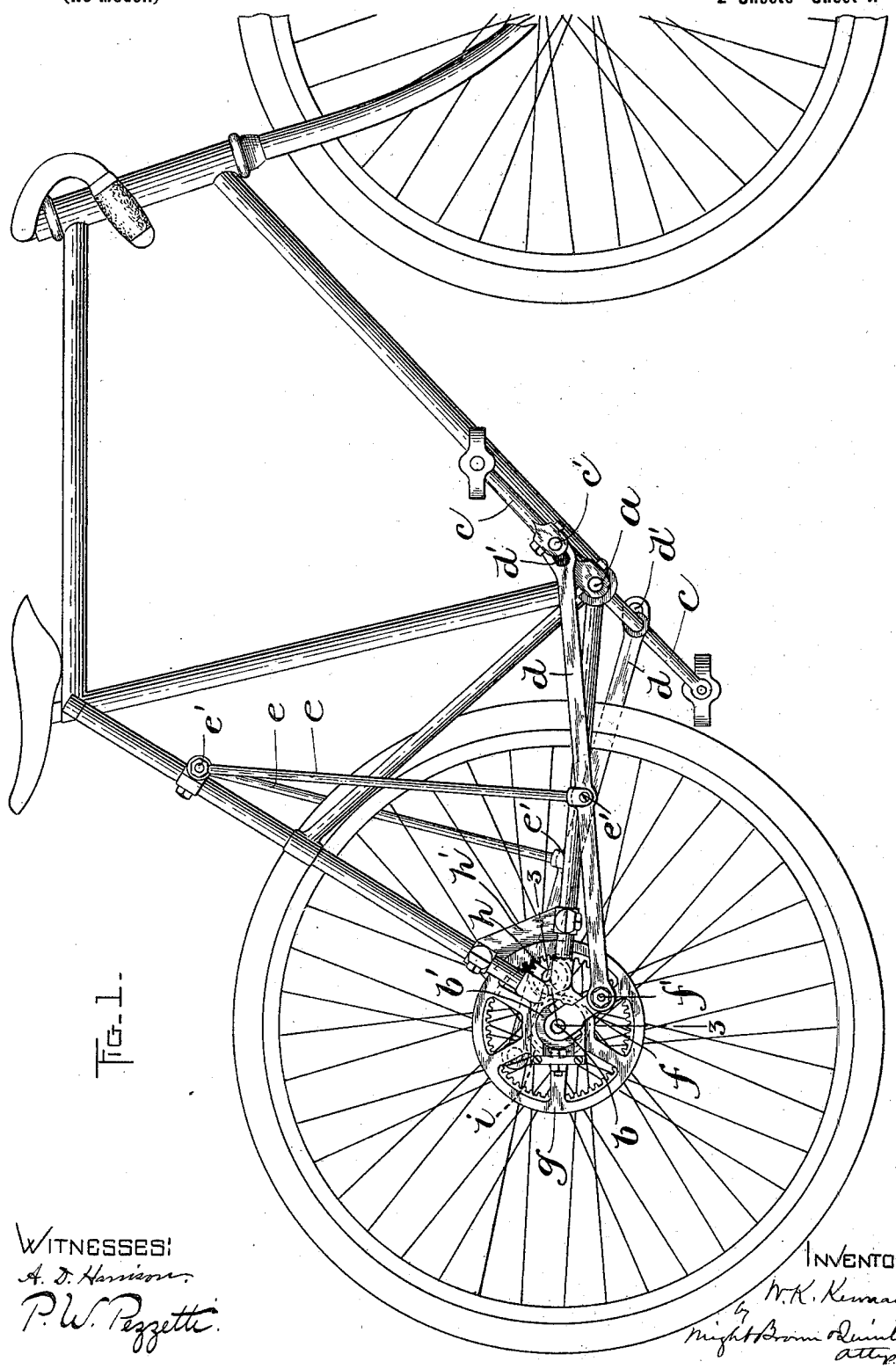

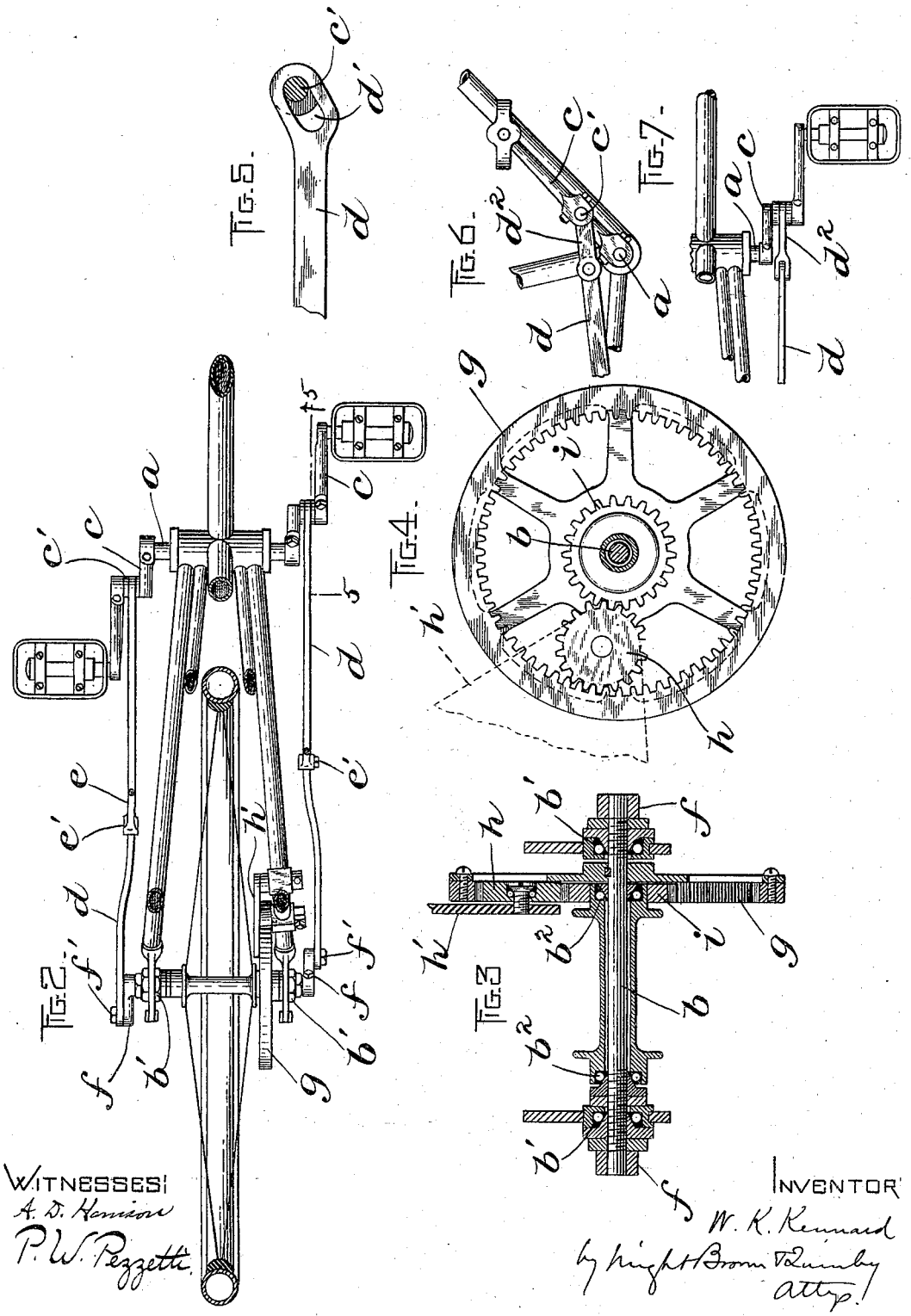

WILLIAM K. KENNARD, OF HAMPDEN, MAINE, ASSIGNOR OF ONE-HALF TO GEORGE W. SMITH AND LEWIS C. SMITH, OF SAME PLACE.

CHAINLESS BICYCLE.

SPECIFICATION forming part of Letters Patent No. 624,500, dated May 9, 1899.

Application filed July 1, 1897. Serial No. 643,097. (No model.)

*To all whom it may concern:*

Be it known that I, WILLIAM K. KENNARD, of Hampden, in the county of Penobscot and State of Maine, have invented certain new and useful Improvements in Chainless Bicycles, of which the following is a specification.

This invention relates to bicycles and similar vehicles in which power is transmitted from the driving-shaft to the driven shaft through the medium of levers and gears without the use of a chain.

The invention consists in the improvements which I shall now proceed to describe and claim, reference being had to the accompanying drawings, in which—

Figure 1 represents a side elevation of the rear portion of a bicycle constructed in accordance with my invention. Fig. 2 represents a top plan view of the driving mechanism. Fig. 3 represents a section on the line 3 3 of Fig. 1. Fig. 4 represents a detail view of the gearing. Fig. 5 represents a section on the line 5 5 of Fig. 2. Figs. 6 and 7 represent in side elevation and plan, respectively, a modified construction of the forward ends of the connecting-levers.

The same reference characters indicate the same parts in all the figures.

Referring to the drawings, the letter $a$ designates the crank-axle of the bicycle, and $b$ the rear axle thereof. Attached to the crank-axle are cranks $c$, which are offset intermediate of their ends by wrist-pins $c'$, which operate in slots $d'$, formed in the forward ends of two connecting-levers $d$ $d$. The said levers are fulcrumed intermediate of their ends at $e'$ $e'$ on the lower ends of two vertical swinging rods $e$ $e$, which are pivoted at their upper ends to the frame of the machine, and the levers at their rear ends are connected by wrist-pins $f'$ with cranks $ff$, which are affixed to the rear axle $b$. Thus it will be seen that by revolving the cranks $c$ in a forward direction the cranks $f$ and the rear axle will be revolved in the opposite direction or backward. In order to convert this backward revolution of the rear axle into a forward revolution of the rear wheel, the said axle is provided with a large internally-toothed gear-wheel $g$, which meshes with an idler-gear $h$, the said idler in turn meshing with a gear-pinion $i$, affixed to the hub of the rear wheel. The shaft $b$ is affixed to and drives the large gear $g$. This in turn drives the idler $h$, which is provided with fixed bearings carried by a plate $h'$, which plate is supported by the frame of the machine. The idler in turn drives the rear wheel by means of the pinion $i$ attached thereto. Antifriction ball-bearings are provided for the axle $b$ at $b'$ $b'$ in the rear forks, and for the rear wheel at $b^2$ $b^2$ between said axle and the hub of the said wheel and at other points in the mechanism where their use is advantageous. The distance from the center of the crank-axle $a$ to the center of the wrist-pin $c'$ is greater than the distance from the center of the rear axle $b$ to the center of the wrist-pin $f'$, and the fulcrum $e'$ of the connecting-lever $d$ is placed back of the middle point of said lever. In order to compensate for the difference in diameter of the circles traversed by the wrist-pins $c'$ and $f'$, respectively, the connecting-levers $d$ are slotted at $d'$, as shown, to allow a certain amount of free travel of the wrist-pin $c'$. In each stroke of each crank $c$ at the top of the stroke the treadle is advanced from a position immediately in the rear of the vertical line or "dead-center" to a position immediately in front thereof without performing any work in propelling the vehicle, and the treadle is thereby put in an advantageous position for the downward stroke.

I reserve the right to vary details of construction within the scope of my invention— as, for instance, by dispensing with the slots $d'$ and substituting therefor the construction shown in Figs. 6 and 7, wherein a link $d^2$ is used to connect the forward end of the connecting-lever $d$ with the wrist-pin $c'$. On the upward portion of the stroke of the crank $c$ said link folds under the end of the lever $d$ and is straightened out at the beginning of the downward stroke.

I claim—

The herein-described driving mechanism for rear-wheel-driven vehicles, comprising a crank-shaft and two pedal-cranks, two levers of the first order mounted to reciprocate as well as to vibrate and connected with the pedal-cranks, a crank-shaft passing through the rear-wheel hub and having a crank at each end, and a three-part differential gear whereof the outer wheel is connected with the last-mentioned shaft, the central pinion with the road-wheel, and the intermediate wheel-carrier with the frame, the intermediate wheel meshing both with the outer wheel and with the central pinion, substantially as set forth.

In testimony whereof I have signed my name to this specification, in the presence of two subscribing witnesses, this 25th day of June, A. D. 1897.

WILLIAM K. KENNARD.

Witnesses:
    JOHN C. BOYD,
    G. A. ERSKINE.